United States Patent
Hoogerbrugge

(10) Patent No.: US 7,568,082 B2
(45) Date of Patent: Jul. 28, 2009

(54) MEMORY CONTROLLER AND METHOD FOR WRITING TO A MEMORY

(76) Inventor: Jan Hoogerbrugge, Prof. Holstlaan 6, 5656 AA Eindhoven (NL)

(*) Notice: Subject to any disclaimer, the term of this patent is extended or adjusted under 35 U.S.C. 154(b) by 389 days.

(21) Appl. No.: 10/541,266

(22) PCT Filed: Nov. 26, 2003

(86) PCT No.: PCT/IB03/05709

§ 371 (c)(1),
(2), (4) Date: Jun. 30, 2005

(87) PCT Pub. No.: WO2004/059499

PCT Pub. Date: Jul. 15, 2004

(65) Prior Publication Data

US 2006/0106969 A1   May 18, 2006

(30) Foreign Application Priority Data

Dec. 30, 2002   (EP)   .................... 02080598

(51) Int. Cl.
G06F 12/00 (2006.01)
G06F 13/00 (2006.01)
G06F 13/28 (2006.01)

(52) U.S. Cl. ...................... 711/170; 711/104
(58) Field of Classification Search ................. 711/104, 711/170
See application file for complete search history.

(56) References Cited

U.S. PATENT DOCUMENTS

| | | | | |
|---|---|---|---|---|
| 5,517,660 A | * | 5/1996 | Rosich | 711/117 |
| 5,627,993 A | * | 5/1997 | Abato et al. | 711/143 |
| 5,982,675 A | | 11/1999 | Fujimoto | |
| 6,052,303 A | | 4/2000 | Chevallier et al. | |
| 6,151,658 A | * | 11/2000 | Magro | 711/110 |
| 6,438,660 B1 | * | 8/2002 | Reams | 711/143 |
| 6,438,665 B2 | * | 8/2002 | Norman | 711/159 |
| 6,678,838 B1 | * | 1/2004 | Magro | 714/42 |
| 6,785,154 B2 | * | 8/2004 | Sunaga et al. | 365/100 |

* cited by examiner

Primary Examiner—Sheng-Jen Tsai

(57) ABSTRACT

The invention provides a controller for a memory having at least one memory cell, that involves a higher cost for writing than for reading. The memory cell is allocated to a first address information and adapted to store memory data. The memory controller of the invention comprises a register. A write controller connected with said register and said memory is adapted to receive a write request comprising said first address information and first write data allocated thereto, ascertain whether said first address information is stored in said register. If yes, the write controller compares said first write data with second write data of an earlier write request in said register allocated to said first address information. If no, it compares said first write data with said memory data allocated to the first address information. The write controller further forwards said first address information and said first write data to said register, respectively, and initiates a write operation of said first or second write data, respectively, from said register to said memory, if the first or second write data, respectively, is different from said memory data. With the memory controller of the invention write power can be saved while providing continuous access to the memory.

24 Claims, 3 Drawing Sheets

MEMORY CONTROLLER AND METHOD FOR WRITING TO A MEMORY

Figure 1:
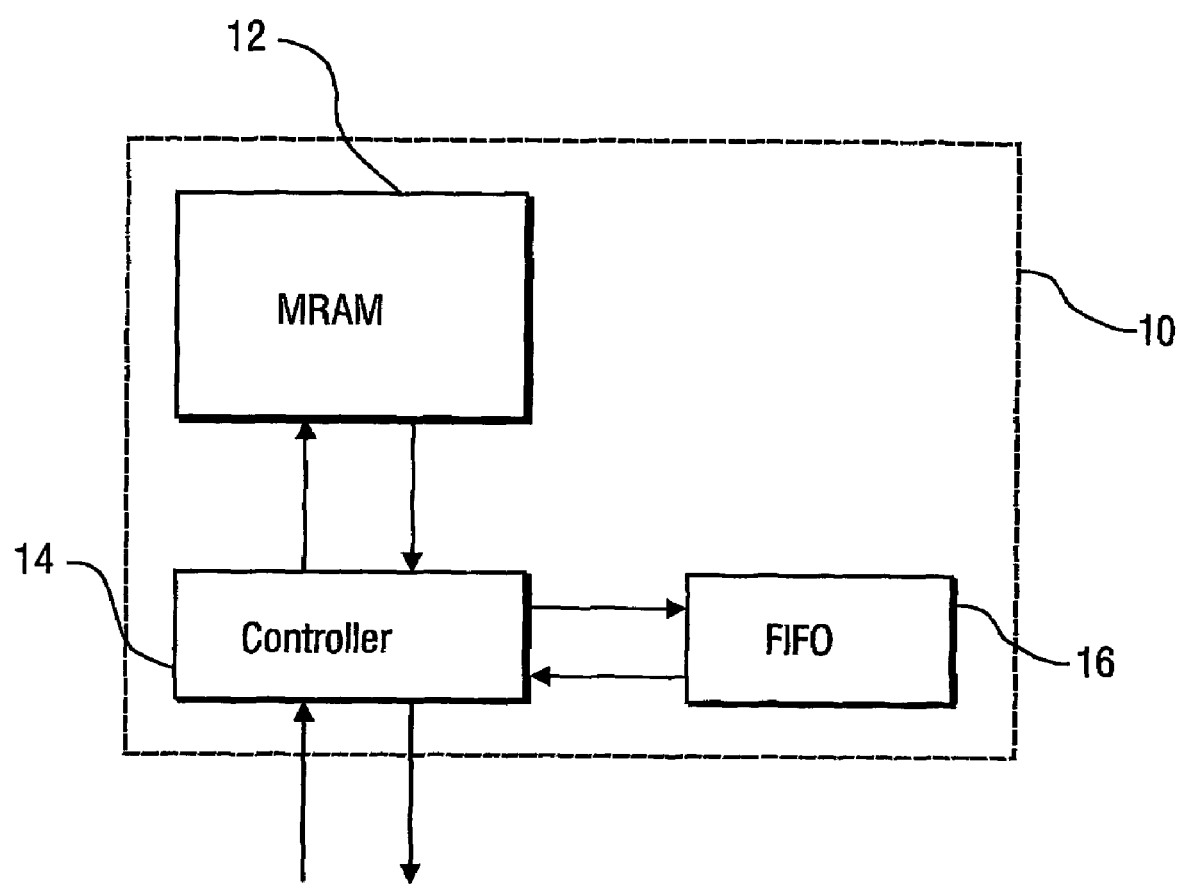

The invention concerns a controller for a memory having at least one memory cell, which memory cell involves a higher cost for writing than for reading. The invention further concerns a method for writing to such a memory.

Magnetic Random Access Memories (MRAM) offer many advantages over existing RAM technologies: With MRAM, it is claimed to reach the writing and reading speed of Static RAM (SRAM), the density of Dynamic RAM (DRAM) and the non-volatility of Flash Memory.

On the other hand, one of the drawbacks of MRAM is the power consumption of a write operation, which is about a magnitude higher than the power consumption of a read operation.

U.S. Pat. No. 6,052,303 discloses a controller for an MRAM system comprising a comparison unit adapted to compare a write data bit to be written to a given address of the MRAM with the memory data bit stored in the cell with that given address. A write operation to this memory cell is performed only if the write data bit is different from the memory data bit. This system and the method implemented therein have the advantage that a writing current is only applied if necessary, that is, when the state of the cell has to be changed to perform the pending write request. This saves some of the energy for a write operation, energy that would otherwise be unnecessarily used to overwrite cells with write bits that are identical to the memory bits currently stored therein.

However, it is a drawback of this controller and the method for writing to an MRAM implemented therein, that the reading operation involved in the comparison of the memory data with the write data as well as the comparing operation of the data increase the delay involved in writing to the memory. This blocks access to the memory for a Central Processing Unit (CPU) or any other memory client at the time of the reading, comparing and, eventually, writing operation. This in turn lowers the overall speed of a data processing system using this kind of MRAM controller and writing method.

This problem is a general one. It exists for any known memory type in which a cost of a write operation is higher than the cost of a read operation. It concerns, for example, also a non-volatile memory based on ferroelectric memory cells (FERAM). The term cost is to be understood as any measurable quantity that is associated with a write process, such as energy, time, power, current density, or voltage.

It is therefore an object of the present invention to provide a controller for such a memory and a writing method that reduces the cost for a write operation on one hand and on the other hand enables a fast access to the memory.

According to a first aspect of the invention, a controller for a memory having at least memory cell being allocated to a first address information and adapted to store memory data, that involves a higher cost for writing than for reading, is provided. The memory controller comprises:
 a register connected with said memory, and having register space for write data and for address information allocated thereto,
 a write controller connected with said register and said memory, and adapted to
  receive a write request comprising said first address information and first write data allocated thereto
  ascertain whether said first address information is stored in said register
  if yes, compare said first write data with second write data in said register allocated to said first address information,
  if no, compare said first write data with said memory data allocated to the first address information
  forward said first address information and said first write data to said register, respectively
  initiate a write operation of said first or second write data, respectively, from said register to said memory, if the first or second write data, respectively, is different from said memory data.

The memory controller of the present invention has a register connected with the memory. The term register is used in the context of the present invention for any type of fast-access, temporary storage means. Preferred embodiments using different types of registers will be described below. In operation, the register can be used to temporarily store write data, which in this context are also called first write data, and address data, in this context also called first address information, allocated thereto. As soon as the memory controller has served the write request containing the first address data and first write data, the corresponding storage space in the register is open to be used for another write request.

The temporary nature of the data storage in the register allows usage of known semiconductor memory technologies for the register that have a low cost for writing, in contrast to the actual memory, which for instance is an MRAM.

With the register, the memory controller is enabled to postpone a requested writing operation to a point in time when no other memory clients request access to the memory. A write request, that is, first write data and first address information allocated thereto, can be stored temporarily in the register. This makes the memory available for other memory clients even at times when one or more write requests are pending. This way, the overall access speed to the memory is increased over solutions which do not use a register and in which, therefore, the memory is not accessible at times when write requests are being served by the memory controller.

The register can be integrated with the controller into one integrated circuit (IC). Also, the register can be implemented near the memory in order to avoid long distances to be travelled by data in write operations. Thus, integration of the controller and the register with the memory into one memory device provides an embodiment of the present invention, that best increases the speed of writing and reading access to the memory.

In the memory controller of the present invention, a write controller is connected with the register and the memory. In operation, the write controller generally serves to let the memory controller perform write operations only to those memory cells which have memory data bits stored that are different from the first write data bits allocated to the respective addresses of the memory cells of a write request to be served. For this, the write controller is adapted to compare first write data with said memory data allocated to the first address information and forward said first address information and said first write data to the register if the first write data is different from the second write data or said memory data, respectively.

In addition, the write controller of the memory controller of the present invention is adapted to manage the input and output operations to and from the register. It provides writing access to the memory for all memory clients without making the register "visible" to the clients.

According to the invention, the write controller is adapted to ascertain before a write operation, whether a write request is directed to a memory address for which there exists a pending write request in the register already. The write data of this earlier write request are in this context called second write data, and the corresponding address information is called second address information. In a first case, where there is no second address information equal to the first address information in the register, a comparison is done between the first write data and the memory data allocated to the first address information. In the second case of an existing earlier write request to the same memory address, it is unnecessary to access the memory. The comparison is rather done between the first and second write data. Only those first write data which are different from (earlier) second write data in the register need to be written to the memory, awaiting a write operation from the register to the memory at a convenient point in time. The first write data are always stored in the register along with the pertaining first address information.

In the memory controller of this invention the first address information and first write data are forwarded to the register irrespective of whether they are actually to be written to the memory at a later time. However, the write controller is adapted to initiate a write operation of the first write data from the register to the memory only if the first write data is different from the memory data at the address corresponding to the first address information.

Thus, by providing an appropriate management of the register as just described, the memory controller of the invention enables a short access time to the memory in most situations.

It is a question of the actual system design to provide an appropriate storage capacity of the register. The higher the storage capacity, the more requests can be postponed. However, a large number of delayed write requests bears the risk of data loss in a system break down due to the volatile nature of the register.

The memory controller can be used for any size of memory, beginning, in principle, with a one-cell structure. The memory controller has most advantages for larger memory structures, especially larger MRAM structures.

In a preferred embodiment, the register is a FIFO register. In the FIFO register, a current write request is appended to the end of a queue of earlier write requests that still await the writing operation. The requests are served in the order first-in-first-out, where "in" means an input into the register, and "out" means a writing operation from the register to the memory.

A further preferred embodiment of the invention comprises a read controller connected with the register and the memory. The read controller is adapted to receive a read request comprising the first address information ascertain whether the first address information is stored in the register forward the read request to the register or the memory, depending on whether or not, respectively, the first address information is stored in the register. The memory manager of this embodiment provides the advantages of the register also read operations from the memory. It makes sure, that upon a read request the latest data always allocated to the address information given in the read request is returned to the client that originated the read request. That address information is called first address information for reasons of simplicity as well. It is obvious, however, that a write request may be directed to a different address in a memory than a read request.

In this embodiment, the write controller is preferably adapted to send to said read controller a read request upon reception of said write request, said read request comprising said first address information contained in said write request. This way the write controller makes efficient use of the read controller for assessing whether a new write request is for a memory address that is already contained in the register or not. The read controller will find out and accordingly return either the corresponding memory data or the corresponding second data contained in the register.

In a further preferred embodiment of the memory controller of the invention the write controller is additionally adapted to allocate a flag indicative of the result of the comparison to said first write data and to transfer the flag to said register along with said first write data and said first address information, and to initiate a write operation to the memory only for first write data for which the flag is indicative of a difference between said first write data and said memory data or said second write data, respectively. In this embodiment, a data structure comprising three components is written to the register: the first component is the first address information, the second component is the first write data, and the third component is the flag allocated to the first write data. The flag indicates whether the first write data is to be written to the memory or not. As an example, let the flag be a "1" for a first case in which the comparison showed that the first write data is different from the memory data or the second write data, respectively, and "0" in the second case, that is if not different. In a queue type register, when the first write data is the oldest data in the register, the write controller will check the flag and perform the write operation to the memory only if the flag is in the state "1". In any case, the first write data will be replaced in the register by the next oldest write request data.

Thus, this embodiment provides a simple and effective implementation of one of the key functions of the write controller, the conditional write operation.

In a further preferred embodiment of the invention the write controller is adapted to ascertain whether said register is full or empty. This embodiment allows the write controller to adapt its performance to the current request rate. After ascertaining that the register is full, one alternative is to return to a conventional memory operation. This means, first all write requests pending in the register are dealt with. No request from a memory client is served during these write operations. Only after finishing all write operations, a new request is accepted. However, a more effective memory management method is to initiate less write operations from the register to the memory after assessing that the register is full. This allows new requests from memory clients at an earlier point in time. Most preferably, only one write operation is performed after assessing that the register is full before ascertaining again whether there is a request, and whether the register is full. This way, an incoming request can always be accepted to the register. The other pending write requests in the register can be dealt with at times when the rate of new write requests is lower. Again, it is by providing an appropriate register capacity for a given application environment that allows to avoid a full register as much as possible in order to enable memory access to memory clients whenever requested.

In this embodiment, the write controller is preferably adapted to initiate a write operation from the register to the memory after assessing that the register is not empty and in case there is no pending write request. This embodiment will automatically perform pending write requests as long as the register is not empty and no new request is entering through an input port of the memory controller.

In another preferred embodiment of the invention the write controller is adapted to perform the comparison of said first write data with said second write data or said memory for at least one bit at a time.

For instance, the comparison may be performed byte by byte. In this example, less register capacity is needed for memory addressing. For a byte is written to a memory cell block that may be addressed as a whole by one address, or by a first and second address indicating the first and the last cell of the memory block. On the other hand, less energy is saved for writing operations, because in general the probability that a write data byte and a memory data byte are different from each other in at least one bit is much higher than 50%. If only one bit is different, the whole byte in the memory must be overwritten, even though 7 bits are not changed.

Preferably the comparison is performed bit by bit. This embodiment provides the best write power saving result, because every bit, that is, every memory cell is checked for the necessity to overwrite. On the other hand, more register space is needed for addressing. Since memory space in a register is cheap though, this disadvantage is not important in comparison to the advantage of saving write power.

In a further preferred embodiment, an XOR-Gate is provided with a first input for said first write data and a second input for said memory data or said second write data, respectively, and an output port connected with the write controller. The XOR-gate delivers a "1" or a logical "TRUE" if the input bits are different from each other and a "0" or a logical "False" if the input bits are the same. With the XOR-Gate the flag described earlier can be set.

In this embodiment the write controller is preferably adapted to forward said first address information and said first write data to said register after receiving at least one logical "TRUE"-signal from the output of the XOR-Gate.

The memory controller of the present invention can be integrated with a memory to form a memory device.

According to a second aspect of the invention, a controller is provided for a memory having at least one memory cell, that involves a higher cost for writing than for reading, said memory cell being allocated a first address information and adapted to store memory data. The controller comprises:
    a register connected with said memory, and comprising register space for write data and for address information allocated thereto,
    a write controller connected with said register and said memory, and adapted to
    receive a write request comprising said first address information and first write data allocated thereto
    compare said first write data with said memory data allocated to the first address information
    forward said first address information and said first write data to said register if the first write data is different from said memory data, respectively.

The memory controller of the present aspect of the invention has most of the features and advantages of the memory controller previously described. It only lacks the functionality to check the register for pending requests comprising the first address information before a new write request is added to the register. Only the memory data are compared to write data before a request is put into the register.

The present memory controller has the advantage that it is simpler and therefore faster than the memory controller described above. The cost of this advantage is that there will be first and second write requests to the same memory address in the register comprising identical write data for a memory cell or a group of memory cells. This means that these memory cells will first be overwritten when the write operation for the first write request is performed, and then again with the same data when the second write request is served. However, the number of these events is generally not so large.

The memory controller according to the present aspect of the invention may be provided with additional features according to the embodiments described earlier.

According to a third aspect of the invention, a method is provided for writing to a memory. The memory comprises at least one memory cell for storing memory data. This memory cell is uniquely allocated to at least a first memory address and involves a higher cost for writing than for reading. The method uses a writing queue. It comprises the following steps:
    receiving a write request comprising the first address information and first write data allocated thereto
    ascertaining whether said first address information is stored in said writing queue
    if yes, comparing said first write data with second write data in said writing queue allocated to said first address information,
    if no, comparing said first write data with said memory data allocated to the first address information
    forwarding said first address information and said first write data to said writing queue if the first write data is different from the second write data or said memory data, respectively, and
    writing said first write data from said writing queue to said memory cell corresponding to said first address.

The present method is related to the memory controller according to the first aspect of the invention. It uses a writing queue. The writing queue can be implemented by a register as described above. In principle, there is no requirement to use a FIFO-queue. The advantages of the present method of the invention have been described above with reference to the memory controller structures of the invention. The preferred embodiments have also been explained above. The additional features of preferred embodiments are:

According to a preferred embodiment, the first write data of different write requests is written from said writing queue to said memory according to a First-in-First-Out rule.

According to another preferred embodiment, the method further comprises the steps
    receiving a read request comprising said first address information
    ascertaining whether said first address information is stored in said register
    forwarding said read request to said writing queue or said memory, depending on whether or not, respectively, said first address information is stored in said register,
    receiving from said writing queue or said memory, respectively, said writing queue data or said memory data allocated to said first address information.

According to another preferred embodiment, the method comprises a step of performing a read request upon reception of said write request, said read request comprising said first address information contained in said write request.

According to another preferred embodiment, the method comprises a step of ascertaining whether said writing queue is full and/or whether said writing queue is empty. This embodiment preferably comprises a step of writing from the writing queue to the memory after assessing that the register is full. Preferably also, a step of writing from the writing queue to the memory after assessing that the writing queue is not empty and in case there is no pending write request is provided.

Another embodiment comprises a step of comparing at least one bit at a time of said first write data and of said second write data or said memory data.

The comparing step preferably comprises a step of performing a XOR-operation between said first write data and said memory data or said second write data, respectively.

According to a fourth aspect of the invention, a further method for writing to a memory using a writing queue is provided. The memory comprises at least one memory cell for storing memory data, that involves a higher cost for writing than for reading, said memory cell being uniquely allocated at least a first memory address. The method comprises the steps of:
receiving a write request comprising the first address information and first write data allocated thereto
comparing said first write data with said memory data allocated to the first address information
forwarding said first address information and said first write data to said writing queue if the first write data is different from the second write data or said memory data, respectively, and
writing said write data from said writing queue to said memory cell corresponding to said first address.

The present method is related to the memory controller according to the second aspect of the invention. Various Embodiments of the present method have additional features of the embodiments described in the context of the method according to the third embodiment of the invention.

Figure 2:
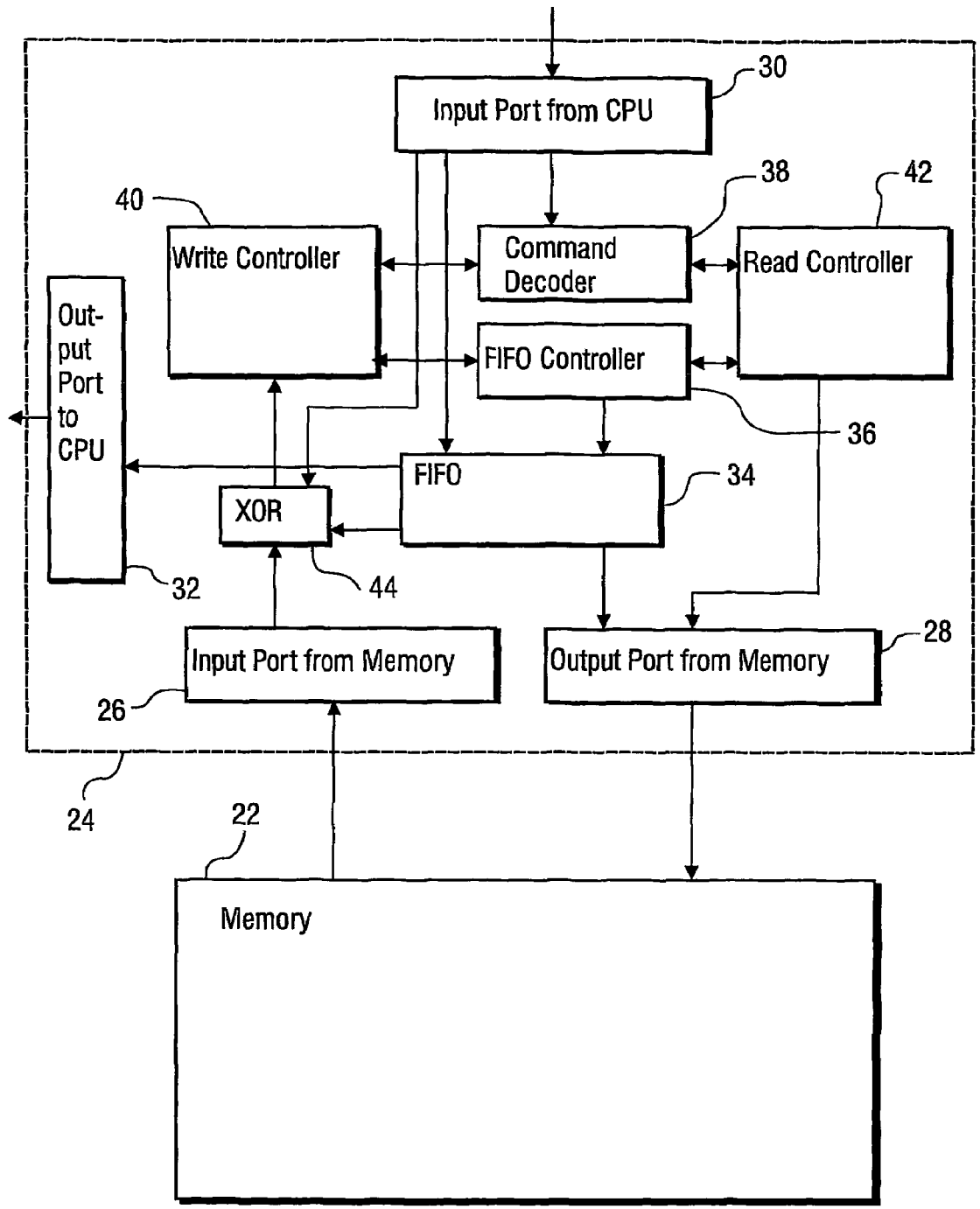
Figure 3:
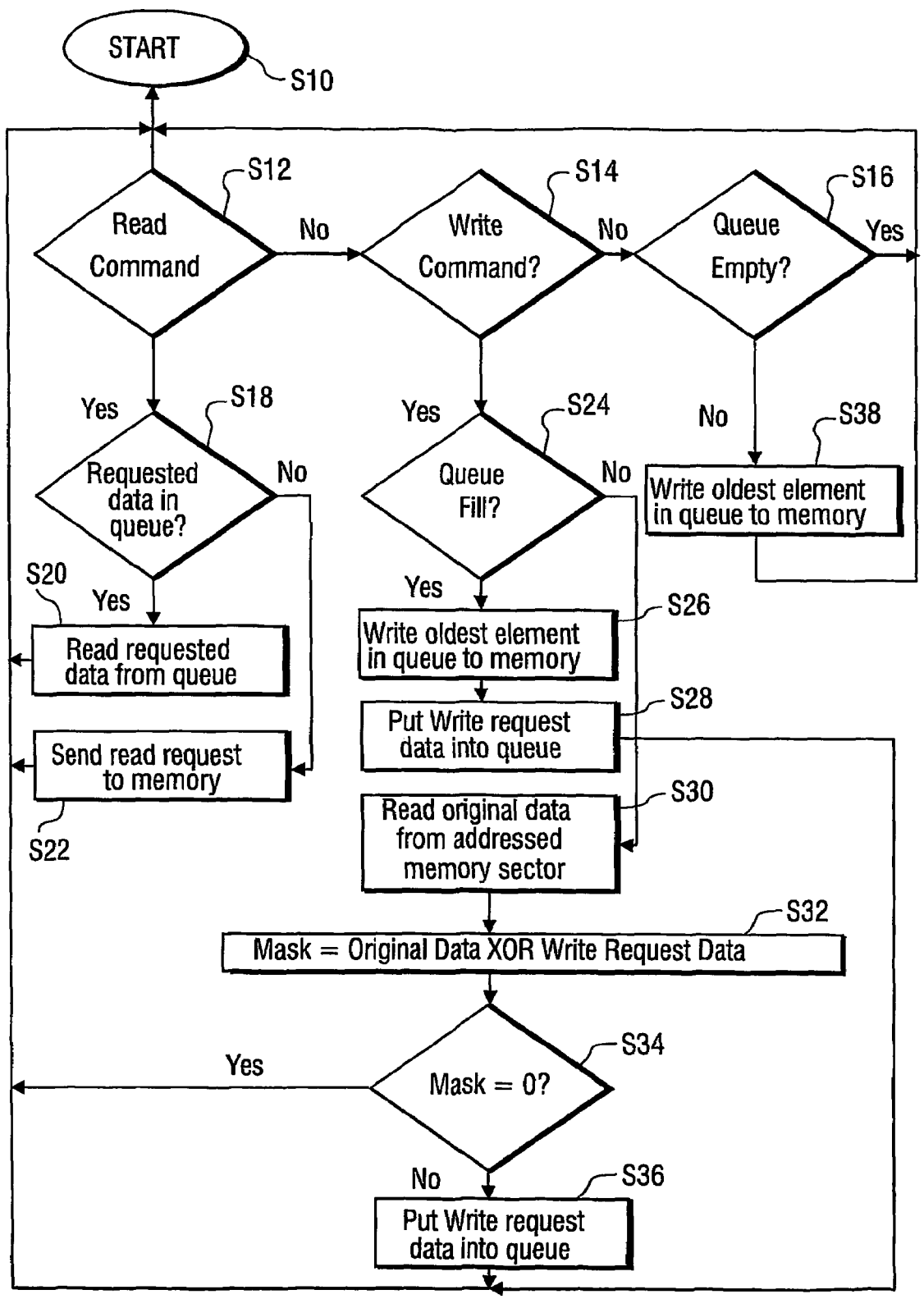

In the following, the present invention will be described in greater detail based on preferred embodiments with reference to the figure, in which:

FIG. 1 shows a block diagram of a MRAM memory with a memory controller according to a first preferred embodiment FIG. 2 shows a detailed block diagram of a MRAM memory with a memory controller according to a second preferred embodiment FIG. 3 shows a flow diagram of a method for writing to a MRAM memory.

FIG. 1 shows a simplified block diagram of a first embodiment of a memory device 10 of the invention. Memory device 10 comprises an MRAM 12. MRAM 12 is a non-volatile magnetic memory with a large number of memory cells. Typically, the memory cells are arranged in the form of a matrix. Each memory cell in MRAM block 12 can be uniquely addressed by a combination of a row address and a column address, as is well known in the art.

Memory device 10 further has a controller 14 connected to MRAM 12. Controller 14 manages read operations from MRAM 12 and write operations to MRAM 12 in communication with external clients of memory device 10. This is indicated by arrows pointing towards and away from controller 14 and crossing the dashed line of memory device 10. Controller 14 is also connected to a First-In-First-Out (FIFO) register 16.

The operation of memory device 10 will be described below in the context of FIG. 2.

FIG. 2 shows as a second embodiment a memory device 20 comprising a MRAM 22 and a controller 24. The block diagram shown represents the logical structure of the device. A physical implementation of the device may look different than the structure shown here. The controller has a memory input port 26 for memory data, a memory output port 28 for write data to be written to MRAM 22, a client input port 30 for address and write data from memory clients such as a CPU, and a client output port 32 for memory data to be communicated to a memory client.

The memory controller 24 of the embodiment of FIG. 2 has an integrated FIFO register 34 connected to client input port 30. A FIFO controller 36 is also connected to FIFO register 34. Furthermore, a command decoder 38 is connected to client input port 30, and to a write controller 40 and a read controller 42. Interconnected between memory input port 26 and write controller 40 is a XOR-gate 44.

Operation of the memory controller 24 will now be described with reference to the flow diagram of FIG. 3. However, it is noted that the flow shown in FIG. 3 is not bound to be used in the controller structure of FIG. 2. Any appropriate device can perform the method shown in FIG. 3. For instance, the flow can be implemented as software.

An incoming request from a memory client is forwarded from client input 30 to command decoder 38. Command decoder analyses the request. This can be done according to steps S12 and S14 of FIG. 3. In step S12, it is checked whether the request comprises a read command. If this is not the case, command decoder ascertains in step S14 whether the command is a write command.

It is noted that the request analysis routine of steps S12 and S14 is also used to monitor the client input port 30 quasi-continuously. Thus, after step S14 it may turn out that there is neither a read request nor a write request. In this case write controller 40 checks whether the write queue in FIFO register 34 is empty. If this is the case, the method of FIG. 3 arcs back to step S12 to monitor the client input port.

In case of an incoming read request, command decoder 38 forward the request to read controller 42. Read controller 42 extracts the address information comprised by the request and forwards it to FIFO controller 36. FIFO controller 36 maintains a list of addresses comprised by write requests in the FIFO register. If the address is contained in the list, FIFO controller 44 triggers FIFO 34 to send the corresponding write data to client output port 32. FIFO controller 36 returns to read controller 42 that the read request has been served. If the address is not contained in the list, FIFO controller returns this result to read controller 42, which will in turn trigger a read operation from the given address in MRAM 22. MRAM will return the requested data to memory input port 26. The data will from there be forwarded to client output port 32 and sent to the requesting client.

In case of an incoming write request write controller 42 will first ascertain whether the FIFO register is full. If this is the case, the oldest write request in the queue of FIFO register 34 will be served.

A write request is served in the present embodiment, deviating in part from the flow of FIG. 3, in the following way: write controller 40 sends a read request to read controller 42. Read controller 42 performs steps S18 to S22 and returns either data from queue 34 or from memory 22. The flow of FIG. 2 shows a simplified version in which data is read directly from the addressed memory sector in a step S30.

These data are forwarded from either memory input port 26 or FIFO 34 to XOR-Gate 44. XOR-Gate 44 performs the logical "EXCLUSIVE-OR" operation with the write data and the memory or register data, respectively, in step S32. That is, XOR-Gate 44 will return to write controller 40 a signal, called "mask" herein, which will be a "TRUE" signal ("1") if the data at the inputs of XOR-Gate 44 are different from each other. It will return a "FALSE"-signal if they are identical.

Write controller 40 will attach the signal from XOR-Gate 44 to the write request and forward the write request to the FIFO register 34. The data will only be written if the mask is "1".

In case write controller 44 finds in step S24 that the queue in FIFO register 34 is not full, it will jump to step S30 and perform the partly deviating read routine described above.

Below, an algorithm is given that describes the operation of an MRAM controller according to the invention. The algorithm is given in a pseudocode similar to C or C++. It is noted that the symbol "!=" means "not equal" in that code. Comments explaining the following code lines are separated from the code by "/*" and "*/". Every fifth line of the following algorithm is labelled by a number independently from the page lines in order to allow clear reference of the following description.

The algorithm can be divided into three parts: Between lines 1 and 9 the read control operation is defined. Between lines 10 and 24 the write control algorithm is defined. Between lines 25 and 37 the control operation in absence of any request is defined. The write control can be further subdivided: lines 11 to 19 define the write control operation in the case of a full write queue. Lines 19 to 24 define the write control operation in the alternative case that the write queue is not full.

The most important commands in the algorithm below are "queue.enqueue" and "mram.write". The first command triggers writing a data field consisting of the write address information ("req.addr"), the write data ("req.data"), that is, e.g., the FIFO register of FIG. 1 or 2. In line 19, this includes all bits of the write request. In line 26 this includes a "mask" bit indicating the result of the XOR-operation.

The command "mram.write" will write data included in the command to an MRAM address included in the command, if the mask bit is "1".

```
if(req.command = READ)
{
    /* test whether more recent data is in queue */
    if(queue.lookup(req.addr, &data))
        return data;
    /* if not in queue send request to mram */
    return mram.read(req.addr);
}
else if(req.command = WRITE))
{
    if(queue.is_full( ))
    {
        /* in case of a write and a full queue do two things:
        1) write oldest element in queue to mram
        2) put request in queue.
        do this in parallel, the queue remains full. */
        <addr, data, mask> = queue.dequeue( );
        mram.write(addr, data, mask);
        queue.enqueue(<req.addr, req.data, ALL_BITS>);
    }
    else
    {
        orig_data = mram.read(req.addr);
        mask = orig_data req.data;      /* means XOR */
        if(mask != 0)
            queue.enqueue(<req.addr, req.data, mask>)
    }
}
else      /* no request */
{
    if(!queue.is_empty( ))
    {
        /* write pending requests to mram */
        <addr, data, mask> = queue.dequeue( );
        mram.write(addr, data, mask);
    }
}
```

The invention claimed is:

1. A controller for a memory having at least one memory cell, that involves a higher cost for writing than for reading, said memory cell being allocated a first address information and adapted to store memory data, said memory controller comprising:
   a register connected with said memory, and comprising register space for write data and for address information allocated thereto;
   a write controller connected with said register and said memory, and adapted to:
   receive a write request comprising said first address information and first write data allocated thereto;
   store the first write data and the first address information to said register;
   ascertain whether said first address information is equal to second address information for a pending write request stored in said register, wherein said pending write request comprises said second address information and corresponding second write data;
   if yes, determine if said first write data stored in said register is different from said second write data of said pending write request stored in said register and initiate a write operation of said first write data to forward said first write data from said register to said memory in response to a determination that said first write data is different from said second write data;
   if no, compare said first write data with said memory data allocated to the first address information and initiate a write operation of said first write data to forward said first write data from said register to said memory in response to a determination that the first write data is different from said memory data.

2. The memory controller of claim 1, wherein said register is a FIFO register.

3. The memory controller of claim 1, further comprising a read controller connected with said register and said memory, and adapted to:
   receive a read request comprising said first address information;
   ascertain whether said first address information is stored in said register; and
   forward said read request to said register or said memory, depending on whether or not, respectively, said first address information is stored in said register.

4. The memory controller of claim 3, wherein said write controller is adapted to send to said read controller a read request upon reception of said write request, said read request comprising said first address information contained in said write request.

5. The memory controller of claim 1, wherein the write controller is adapted to allocate a flag indicative of the result of the comparison to said first write data and to transfer the flag to said register along with said first write data and said first address information, and to initiate a write operation to the memory only for first write data for which the flag is indicative of a difference between said first write data and said memory data or said second write data, respectively.

6. The memory controller of claim 5, wherein the write controller is adapted to ascertain whether said register is full or empty.

7. The memory controller of claim 6, wherein the write controller is adapted to initiate at least one write operation from the register to the memory after assessing that the register is full.

8. The memory controller claim 1, wherein the write controller is adapted to initiate a write operation from the register to the memory after assessing that the register is not empty and in case there is no pending write request.

9. The memory controller of claim 1, wherein the write controller is adapted to perform the comparison of said first write data with said second write data or said memory for at least one bit at a time.

10. The memory controller of claim 9, wherein the write controller is adapted to perform the comparison byte by byte or bit by bit.

11. The memory controller of claim 9, wherein the write controller is adapted to perform the comparison bit by bit.

12. The memory controller of claim 9, comprising an XOR-Gate with a first input for said first write data and a second input for said memory data or said second write data, respectively, and an output port connected with the write controller.

13. The memory controller of claim 9, wherein the write controller is adapted to forward said first address information and said first write data to said register after receiving at least one logical "TRUE"-signal from the output of the XOR-Gate.

14. The memory controller of claim 1, wherein said memory comprises at least one non-volatile memory cell.

15. The memory controller of claim 1, wherein said memory comprises memory cells from the group of MRAM and FERAM.

16. A method for writing to a non-volatile memory using a writing queue, said memory comprising at least one memory cell for storing memory data, said memory cell being uniquely allocated at least a first memory address and requiring a higher cost for writing than for reading, comprising the steps of:

receiving a write request comprising the first address information and first write data allocated thereto;

storing the first write data and the first write address to said register;

ascertaining whether said first address information is equal to second address information for a pending write request stored in said writing queue, wherein said pending write request comprises said second address information and corresponding second write data;

if yes, determining if said first write data stored in said register is different from said second write data of said pending write request stored in said register and writing said first write data from said writing queue to said memory cell corresponding to said first address information in response to a determination that said first write data is different from said second write data;

if no, comparing said first write data with said memory data allocated to the first address information and writing said first write data from said writing queue to said memory cell corresponding to said first address information in response to a determination that the first write data is different from said memory data.

17. The method of claim 16, wherein said first write data of different write requests is written from said writing queue to said memory according to a First-in-First-Out rule.

18. The method of claim 16, further comprising the steps
receiving a read request comprising said first address information ascertaining whether said first address information is stored in said writing queue;
forwarding said read request to said writing queue or said memory, depending on whether or not, respectively, said first address information is stored in said writing queue;
receiving from said writing queue or said memory, respectively, said writing queue data or said memory data allocated to said first address information.

19. The method of claim 16, comprising a step of performing a read request upon reception of said write request, said read request comprising said first address information contained in said write request.

20. The method of claim 16, comprising a step of ascertaining whether said writing queue is full and/or whether said writing queue is empty.

21. The method of claim 20, comprising a step of writing from the writing queue to the memory after assessing that the register is full.

22. The method of claim 20, comprising a step of writing from the writing queue to the memory after assessing that the writing queue is not empty and in case there is no pending write request.

23. The method of claim 16, comprising a step of comparing at least one bit at a time of said first write data and of said second write data or said memory data.

24. The method of claim 23, wherein said comparing step comprises a step of performing an XOR-operation between said first write data and said memory data or said second write data, respectively.

* * * * *